United States Patent Office 2,802,889
Patented Aug. 13, 1957

2,802,889

SELECTIVE HYDROGENATION OF ACETYLENE IN ETHYLENE AND CATALYST THEREFOR

Ludo K. Frevel, Midland, and Leonard J. Kressley, Saginaw, Mich., assignors to The Dow Chemical Company, Midland, Mich., a corporation of Delaware No Drawing. Application June 1, 1954,
Serial No. 433,809

10 Claims. (Cl. 260—677)

This invention relates to the selective hydrogenation of acetylene in the presence of ethylene. It pertains especially to a catalytic method, and catalysts, for the treatment of mixtures comprising ethylene and acetylene whereby the acetylene is selectively and substantially hydrogenated and is converted, at least in part, to ethylene. The invention provides catalysts which are highly selective for hydrogenation of acetylene in ethylene, which retain that high catalytic activity for long periods of use, and which give rise to only a small proportion of side reactions.

Ethylene is commonly produced by pyrolysis of hydrocarbonaceous materials. Ethylene so produced usually contains at least small proportions of acetylene. For many purposes for which ethylene is intended, the presence of acetylene is undesirable and steps must be taken to effect removal of acetylene from the mixture.

It is already known that acetylene can be hydrogenated and procedures have been described for partially hydrogenating acetylene to ethylene. However, the methods previously proposed for selectively hydrogenating acetylene in the presence of ethylene in order to effect purification of the ethylene have not been altogether satisfactory, especially for practice on a continuous commercial scale. In some instances, the methods, and catalysts therefore, are not sufficiently effective to consume all of the acetylene from the mixture with ethylene. In other instances, the methods and catalysts are overly active causing the conversion of the acetylene to ethane. In some such instances, a part of the initial ethylene is also converted to ethane resulting in a loss of ethylene. Some of the proposed methods also cause a considerable amount of charring or carbonization or polymerization of acetylene to occur in the reaction zone. While such by-product reactions may be of minor consequence in small-scale or short-time tests, they can be of serious consequence to a large-scale, commercial operation. In some instances, previously known methods require special conditions, e. g. critical temperatures, pressures, rates of flow, presence of diluent gases such as steam or carbon dioxide, special equipment or materials of construction, or other unique requirements which are often inconvenient or too expensive to provide.

An object of this invention is to provide a method, and catalysts, for the treatment of gas mixtures comprising ethylene and acetylene whereby the acetylene is selectively and substantially consumed.

A further object is to provide such a method and catalysts whereby acetylene in admixture with ethylene is hydrogenated to form a further amount of ethylene, without the concurrent consumption of a significant proportion of ethylene.

Another object is to provide such a method and catalysts whereby the operations can be continued for a prolonged time on a large scale without occurrence of a dishabilitating proportion of side reactions such as carbonization and polymerization.

Another object is to provide such a method that can be carried out on a dry ethylene-containing gas without the addition thereto of water vapor or inert diluents such as carbon dioxide.

Another object is to provide such catalysts which, after being inactivated by extensive use, can be readily and effectively regenerated and restored.

Further objects and advantages will be evident from the following description.

The objects of this invention are attained in a method for treatment of acetylene-containing ethylene with hydrogen while contacting the resulting gas mixture with a catalytic body comprising, as the active catalytic material, an intimate mixture of palladium and a modifying proportion of a promoting element selected from group $Ib$ of the periodic table of the elements, i. e., copper, silver and gold, all as hereinafter more completely described.

The catalytic contact bodies preferably employed in practice of this invention are novel compositions, usually consisting of the catalytically active material deposited in and/or on a catalytically inactive supporting material such as pumice, inactive alumina, diatomaceous earth, asbestos, coke or charcoal or the like. The catalytically active material can be deposited in and/or on the catalytically inactive supporting material by any of the already known procedures for making supported catalysts. Usually, the supporting material is impregated with an aqueous solution of the necessary metal nitrates, the resulting mixture heated to drive off the water and roasted to convert the nitrates to oxides, and hydrogenated to reduce the metal oxides in and/or on the supporting material to catalytically active colloidal metals. Similarly, other metal compounds, e. g. metal hydroxides, metal carbonates or metal halides, which are convertible to metal oxides by heating or by heating in air, can be used. Catalytic compositions are also made by blending together finely divided catalytically inactive supporting materials with solutions of, or dry compositions of, the necessary metal salts, pressing the resulting mixtures into pellets or other suitable shapes, and then heating, roasting and reducing the composition to prepare the catalytically active contact body.

The catalysts are usually prepared so that the composite material contains from about 0.1 to about 5 percent by weight of reduced, catalytically active metal.

Particularly satisfactory catalysts, according to this invention, are ones in which the catalytically active material is composed principally of colloidal palladium together with a modifying proportion, e. g. from about 1 to about 40 percent by weight, of a metal from group $Ib$ of the periodic table of the elements such as copper, silver or gold.

While the mode of making supported metal catalyts is well known, the activity of the present catalysts is to some extent influenced by certain conditions and steps employed in their preparation. The activity of the catalysts is increased by bettering the dispersion of the catalyst-forming material over and through the inactive supporting material. The activity of catalysts made from water-solutions of metal salts is increased by tumbling the mixture of such solutions and the inactive supporting material without drying for a time adequate to insure uniform impregnation and coating of the solid matter with the salt solution. Further, such catalysts are bettered by constant or frequent stirring or other agitation of the mixture during the drying step. Catalysts made by roasting the mixture of carrier material and metal salts before reduction are generally more active than ones made by concurrent roasting and reduction.

When the catalysts are made from the nitrates, i. e., an aqueous mixture of palladium nitrate and copper nitrate, silver nitrate or gold nitrate (in presence of excess nitric acid), the step of drying the impregnated carrier may be performed at temperatures up to the boiling point of water, e. g., on a steam bath, and usually causes the conversion of the palladium nitrate to an amorphous palladium oxide. During such drying step, the gold nitrate composition usually is decomposed, but copper nitrate and silver nitrate remain as such in the dried mixture. Roasting, e. g. to a temperature of about 300° C. or more, is usually required to decompose these last named metal nitrates. However, the activity of the catalyst is detrimentally affected by excessively high temperatures during the roasting step. Roasting temperatures should be high enough to cause decomposition of the metal salt, e. g. nitrate, but not be above about 500° C., and should preferably be between about 325° and 450° C.

The roasted catalysts are activated by heating in contact with hydrogen until the oxides of the catalytic metals are substantially reduced. This step is usually performed by passing a stream of hydrogen gas over the catalyst material in a reaction zone at temperatures between about 25° C. and 450° C., preferably about 200° C., until the oxides of the catalytic metals are substantially reduced, e. g. for 3-4 hours. The reduced catalysts are preferably allowed to cool in an inert atmosphere, e. g. an atmosphere of hydrogen, nitrogen, carbon dioxide or the like.

In practicing the present method, a gas stream of ethylene, containing acetylene to be removed, is admixed with a gas stream of hydrogen (unless an excess of hydrogen is already present in the ethylene-acetylene gas) and the resulting mixture is passed into contact with the catalysts herein described. The gas mixture may contain other materials, such as hydrocarbons, normally incident to the preparation of the ethylene-containing gas, as well as nitrogen, carbon dioxide, small proportions of air, and water vapor. The gas stream should be free of sulfur-containing compounds and, if necessary, a known sulfur absorber, such as basic lead acetate or the equivalent, can be employed to remove sulfur compounds from the feed mixture before contacting that mixture with the hydrogenation catalyst.

The proportion of hydrogen which should be present in, or be added to, the ethylene gas is at least that proportion necessary to hydrogenate all of the acetylene present in the mixture, i. e., one mole or more of hydrogen per mole of acetylene. An excess of hydrogen over that theoretically necessary to react with all of the acetylene is usually required in practical operation. Usually, it is preferred to employ the minimum proportion of hydrogen that satisfactorily removes acetylene from the treated gas product.

The temperature necessary in the reaction zone wherein acetylene is hydrogenated according to this method depends largely on the activity of the catalyst. The catalyst activity, in turn, depends, as hereinbefore described, on the kind of catalytic material and its mode of preparation. Certain of these catalysts are active at room temperature. Generally, temperatures of from 60° to about 200° C. are used in the reaction zone. Catalysts which require reaction temperatures above about 250° C. are considered insufficiently active for general use.

The pressure of the gas in the hydrogenation reaction zone does not appear to be critical and can be at, above, or below atmospheric pressure.

The rate of flow of the gas mixture over the catalyst in a continuous process should be such that a satisfactory removal of acetylene is accomplished.

The proportion of acetylene in either the ethylene feed gas or the treated gas product can be determined by known ways of gas analysis. An easy, reliable, semi-quantitative test for acetylene in the treated gas product can be made by contacting a sample portion of the gas with an aqueous ammoniacal cuprous sulfate solution (cupric sulfate reduced with hydroxyl amine) whereby acetylene causes the formation of a red cuprous acetylide. A smaller proportion of acetylene is hydrogenated completely to ethane, a smaller proportion of ethylene is concurrently hydrogenated to ethane, smaller proportions of other side reactions such as polymerization take place and less charring occurs when an acetylene-containing ethylene is hydrogenated over the catalyts of this invention than are usually obtained over catalysts previously known. Therefore, the present catalysts perform better and have a longer useful life than catalysts hithertofore employed for this purpose. When, in use, these catalysts do become inactivated, or become loaded with polymeric material or carbonaceous char, they can be readily reactivated, preferably by re-oxidation at an elevated temperature, e. g. 400° C. (thereby burning off the organic matter, polymer and char and converting at least a part of the catalytic metal to a metal oxide), and once more reducing the catalysts with hydrogen, e. g. at a temperature of 200° C.

The following examples show ways in which the invention has been practiced, but are not to be construed as limiting its scope.

EXAMPLE 1

A palladium-silver catalyst was prepared as follows: To 5 ml. of a 10 percent by weight solution of palladium nitrate in water, was added 65 ml. of water and into the resulting dilute solution there was dissolved 0.0160 gram of silver nitrate. About 100 grams of a diatomaceous earth, in the form of broken granules having an average dimension of about ⅛ inch, was uniformly wetted with 70 mls. of the palladium nitrate-silver nitrate solution and the resulting mixture was dried on a steam bath at about 100° C. with frequent stirring. The dry mixture was roasted in air at a temperature of 400° C., and was reduced in a stream of hydrogen gas at a temperature of 420° C. The resulting catalyst contained 0.20 percent by weight palladium and 0.010 percent by weight silver. The catalyst was a uniform light gray in color and had an apparent bulk density (packing density) of 0.42 gram/ml.

A 50-gram portion of the catalyst just described was placed in a stainless steel tube having a diameter of ¾ inch and a length of 12 inches. A sulfur-removing chamber containing 25 grams of basic lead acetate was placed ahead of the catalyst chamber and connected therewith. A portion of the ethylene product gas stream was withdrawn continuously from a commercial gas cracking plant and passed through the basic lead acetate chamber and thence through the catalyst tube at a rate of 1.5 liters per minute (computed at 25° C., 1 atmosphere pressure). The composition of the ethylene feed stream is more completely described hereinafter. Together with the ethylene feed stream, there was admixed a stream of hydrogen gas, from commercial cylinders thereof, at rates of from 38 to 60 ml. per minute (computed at 25° C., atmospheric pressure), the flow rate being varied depending in part on the proportion of acetylene in the feed gas from time to time and in part on the objectives of the tests. The catalyst bed and the zone containing it was heated to about 100° C. by means of atmospheric pressure steam in a jacket surrounding the catalyst-containing tube. The gas pressure in the reaction zone was about 50 p. s. i. g. The operation was carried on continuously. Daily checks were made on the acetylene content of the product gas by means of an aqueous ammoniacal cuprous sulfate solution. Occasional samples were taken of both the feed gas and the outlet product gas for analysis by the Orsat procedure and for analysis by means of the mass spectrometer. The test was continued for five months. During much of this time, the effluent gas was free of acetylene. However, during parts of the test, the proportion of hydrogen was deliberately decreased so that acetylene appeared in the product, in order to create conditions known to promote polymerization, by-product and char-forming side reactions. This portion of the test was deliberately carried out to test the resistance of the catalyst to damage under unfavorable operating conditions. After five months, although the catalyst was still active and was producing an acetylene-free product, the test was stopped.

At the end of the test, the catalyst was found to be a greenish black color. The weight had increased 84 percent, and the packing density had increased to 0.72 gram per ml. due to the formation of polymer and some char on the catalyst. This accumulation of carbonaceous matter was readily burned off in air at 400° C., and the catalyst was reduced and restored to its original condition and activity. The basic lead acetate in the sulfur-removing chamber was completely exhausted sometime during the test.

In Table I are shown some of the analyses made on the original ethylene feed stream (before admixture with hydrogen) and on the outlet product gas stream during the above test. The analysis values are in percent by volume.

Table I

| Week of Test | Acetylene | | Ethylene | |
|---|---|---|---|---|
| | in | out | in | out |
| Start | 3.5 | [1] 0.5 | 84.7 | 85.3 |
| 5 | 3.1 | 0.0 | 83.9 | 82.8 |
| 7 | 2.8 | [1] 0.5 | 84.2 | 84.6 |
| 8 | 3.3 | [1] 0.6 | 86.7 | 86.6 |
| 10 | 3.5 | 0.0 | 84.3 | 83.3 |
| 13 | 3.0 | [1] 0.1 | 87.0 | 87.2 |
| 17 | 2.4 | [1] 0.2 | 88.4 | 86.9 |
| 21 | 3.0 | 0.0 | 87.2 | 87.9 |

[1] The rate of feed of hydrogen was deliberately reduced to allow passing of acetylene into the outlet product in order to test the resistance of the catalyst to an unfavorable operating condition.

In Table II are shown more complete analyses, made by the mass spectrometer, of one pair of samples of ethylene feed gas (before admixture with hydrogen) and of product gas. These data are in volume percent.

Table II

| Component | Ethylene Feed Gas | Product Gas |
|---|---|---|
| Acetylene | 1.8 | nil |
| Ethylene | 88.0 | 88.0 |
| Ethane | 7.0 | 9.0 |
| Hydrogen | 0.2 | nil |
| Methane | 1.2 | 1.2 |
| Butanes | 0.06 | 0.05 |
| Butenes | nil | 0.13 |
| $CO_2$ | 1.3 | 1.3 |
| Air | 0.4 | 0.4 |

For purposes of comparison with the above test, a material containing 0.2 percent by weight of palladium alone (without any modifying metal) on a diatomaceous earth carrier, was prepared by steps corresponding to those used in preparation of the above modified catalyst. The unmodified palladium catalyst so prepared was tested in a manner similar to that just described by passing a mixture of acetylene-containing ethylene and hydrogen over the catalyst at about 100° C. and about 50 p. s. i. g. The proportion of hydrogen added was slightly in excess of the minimum proportion necessary to consume all of the acetylene. In contrast to the results obtained in the previously described test with the silver-modified catalyst, the unmodified palladium catalyst became completely choked with polymer and char and was useless after only 6 weeks of operation.

EXAMPLE 2

This example illustrates the preparation and use of a palladium-copper catalyst deposited on an inactive alumina.

A quantity of 10-mesh activated alumina (gamma-alumina) was heated at a temperature of 1000° C. for 6 hours, thereby converting the alumina predominately to inactive kappa-alumina. Twenty-three grams of this inactive alumina was uniformly wetted with 10 ml. of an aqueous solution containing 0.055 gram of palladium nitrate and 0.0048 gram of cupric nitrate tri-hydrate. The resulting mixture was dried with constant stirring at a temperature of about 90° C., roasted at a temperature of 350° C. for 2 hours and reduced in a stream of hydrogen gas at a temperature of 400° C. for 2 hours. The resultant catalyst contained about 0.12 percent by weight active metal, of which 95 percent by weight was palladium and 5 percent was copper.

The catalyst was tested for its ability to remove acetylene selectively from ethylene. For the purpose of laboratory control on the test, a synthetic mixture of gases was made up from the separate ingredients. Separate streams of ethylene, acetylene and hydrogen were taken from storage cylinders and metered through orifice meters under constant pressures maintained by a constant-head bubbling column in each line. The acetylene stream passed through a charcoal absorber to remove acetone and through a chromic acid scrubber to remove any phosphines or arsines. After the three gas streams were brought together and mixed, the mixture was passed through a bed of basic lead acetate to remove sulfides.

The mixed gas stream was then contacted with a bed of 11.4 grams of the catalyst contained in a glass tube 10 cm. long having an internal diameter of 1.2 cm. and heated by a cylindrical electric heater surrounding the catalyst tube.

In this test, the following operational conditions were employed:

Temperature of reaction zone, ° C _____ 90
Flow of ethylene (1 atm., 23° C.), ml./minute ____ 160
Flow of acetylene (1 atm., 23° C.), ml./minute ____ 4.5
Flow of hydrogen (1 atm., 23° C.), ml./minute ____ 5.5

During the test, a sample of the inlet mixed gas and a sample of the outlet product gas were taken and analyzed as follows, the data being in per cent by volume:

| | Inlet Gas | Product Gas |
|---|---|---|
| Ethylene | 91 | 95. |
| Acetylene | 2.4 | less than 1 part per million. |
| Hydrogen | 2.6 | nil. |
| Ethane | 1.8 | 2.5. |
| Carbon dioxide | 0.6 | 0.6. |
| Butenes | nil | 0.24. |
| Propane | nil | 0.1 or less. |
| Propylene | nil | 0.1 or less. |
| Air | 0.5 | 0.4. |

After four hours of continuous operation under the above conditions, although the catalyst was still active, the test was terminated. To test the catalyst's behavior on regeneration, the used catalyst was oxidized in a stream of air at a temperature of 400° C. for two hours and was reduced in a stream of hydrogen at a temperature of 400° C. for two hours. The regenerated catalyst, retested with a gas mixture of ethylene, acetylene and hydrogen, had the same catalytic activity as the original catalyst.

In contrast to the results obtained in the tests just described, a commercial catalyst, having 0.5 percent by weight of colloidal palladium only (no modifying metal) on an alumina carrier, lasted only ten minutes in a test under the conditions described above before acetylene began to appear in the outlet gas product, and the catalyst was unable thereafter completely to remove acetylene from the gas mixture even at a temperature of 150° C.

EXAMPLE 3

A group of catalysts was made in which mixtures of catalytic metals comprising palladium were deposited on inert carriers. In some of these catalysts, palladium was combined with copper, in others with silver, and in others with gold. In each of the catalysts, the proportion of total catalytic metal was equivalent to 0.2 percent by weight of the combined catalytic metal and the inert carrier. Most of these catalysts comprised diatmoaceous earth as the carrier, but on ewas made using pumice as the supporting material.

The catalysts were made by the same general procedure as follows:

A calculated amount of palladium nitrate was dissolved in distilled water and acidified with a few drops of nitric acid. A measured amount of a metal salt corresponding to the desired modifying metal was then dissolved in the solution and the resulting solution was diluted to 75 ml. In each instance such amounts of palladium nitrate and of the modifying metal material were taken that the 75 mls. of solution contained 0.2 gram of metals in the form of soluble compounds. As sources of the desired modifying metals, the following materials were used:

For copper—$Cu(NO_3)_2 \cdot 3H_2O$
For silver—$AgNO_3$
For gold—$HAuCl_4$ solution Fifteen millimeters of a solution so prepared, containing 0.04 gram of the metals in the form of salts, was then added slowly to 20 grams of the carrier material constantly stirred in an evaporating dish. Stirring was continued until all of the carrier appeared to be uniformly wetted with the aqueous solution. The mixture was then dried on a steam bath with continued stirring. The dried catalyst preparations were then roasted in an air furnace at a temperature of 350° C. for two hours. Part of each roasted catalyst was then separately placed in a glass tube and heated in a stream of hydrogen gas at a temperature of 400° C. for three to four hours. The reduced catalysts were allowed to cool in an atmosphere of hydrogen.

In such a manner, there were produced catalysts having the following compositions:

| Active Metal Composition, Percent by Weight | Kind of Carrier |
| --- | --- |
| 95 Pd—5 Cu | diatomaceous earth. |
| 90 Pd—10 Cu | same. |
| 80 Pd—20 Cu | same. |
| 70 Pd—30 Cu | same. |
| 60 Pd—40 Cu | same. |
| 95 Pd—5 Ag | same. |
| 90 Pd—10 Ag | same. |
| 80 Pd—20 Ag | same. |
| 70 Pd—30 Ag | same. |
| 60 Pd—40 Ag | same. |
| 90 Pd—10 Ag | pumice. |
| 95 Pd—5 Au | diatomaceous earth. |
| 60 Pd—40 Au | same. |

All of the catalysts so constituted and so prepared were catalytically active for selectively hydrogenating acetylene in admixture with ethylene and hydrogen when tested in the manner and apparatus described in Example 2 at temperatures ranging from about 60° to 250° C. For instance, analyses of feed and product gases over the 70% palladium and 30% silver catalyst at 160° C. are as follows:

| Component | Feed gas, vol. percent | Product gas, vol. percent |
| --- | --- | --- |
| Acetylene | 2.4 | nil |
| Ethylene | 90 | 95 |
| Ethane | 1.4 | 2.0 |
| Hydrogen | 4 | 1 |
| Methane | 1.6 | 1.8 |
| Butenes | 0.04 | 0.18 |
| Butadienes | nil | 0.02 |
| Carbon dioxide | 0.6 | 0.5 |

We claim:

1. A method for treatment of a gaseous mixture comprising ethylene and acetylene, which method comprises selectively hydrogenating the acetylene therein by contacting that mixture, together with hydrogen in proportion greater than one mole of hydrogen per mole of acetylene, with a catalytic body containing an effective proportion of a composite metal material wherein are from 60 to 99 parts by weight of palladium and from 40 to 1 part of an element selected from the group consisting of copper, silver and gold.

2. A method for treatment of a gaseous mixture comprising ethylene and acetylene, which method comprises selectively hydrogenating the acetylene by contacting that mixture, together with hydrogen in proportion greater than one mole of hydrogen per mole of acetylene, with a catalytic body containing an effective proportion of a composite metal material wherein are from 60 to 99 parts by weight of palladium and from 40 to 1 part of an element selected from the group consisting of copper, silver and gold at a reaction temperature below about 250° C.

3. A method for treatment of a gaseous mixture comprising ethylene and acetylene, which method comprises selectively hydrogenating the acetylene by contacting that mixture, together with hydrogen in proportion corresponding to more than one mole of hydrogen per mole of acetylene, at a hydrogenation reaction temperature with a catalyst comprising a catalytically inactive carrier and an effective proportion of a catalytically active metal composition wherein are from 60 to 99 parts by weight of palladium and from 40 to 1 part of an element selected from the group consisting of copper, silver and gold, whereby the acetylene is substantially consumed.

4. A method for treatment of a gaseous mixture comprising ethylene and acetylene, which method comprises selectively hydrogenating the acetylene by contacting that mixture, together with hydrogen in proportion corresponding to more than one mole of hydrogen per mole of acetylene, at a hydrogenation reaction temperature between room temperature and about 250° C. with a catalyst comprising a catalytically inactive carrier and an effective proportion not greater than 5 percent by weight of the catalyst of a catalytically active metal composition consisting of from 60 to 99 parts by weight of palladium and from 40 to 1 part of an element selected from the group consisting of copper, silver and gold, whereby the acetylene is substantially consumed.

5. A catalyst, effective in promoting the selective hydrogenation of acetylene in contact with a gas mixture of acetylene, ethylene and hydrogen, which catalyst comprises a catalyticaly inactive carrier and an effective proportion not greater than 5 percent by weight of the catalyst of a catalytically active metal composition consisting of from 60 to 99 parts by weight of palladium and from 40 to 1 part of a modifying element selected from the group consisting of copper, silver and gold.

6. A catalyst according to claim 5 wherein the modifying element is copper.

7. A catalyst according to claim 5 wherein the modifying element is silver.

8. A catalyst according to claim 5 wherein the modifying element is gold.

9. A method of making a catalyst, effective in promoting the selective hydrogenation of acetylene when contacted with a gas mixture of acetylene, ethylene and hydrogen, which method comprises impregnating a catalytically inactive carrier solid material with an aqueous solution comprising a soluble salt of palladium and a soluble salt of a metal selected from the group consisting of copper, silver and gold, said salts being capable of being decomposed by heating at temperatures below about 500° C., drying the resulting mixture of carrier material and salt solution while stirring the mixture, roasting the dried composition while exposed to air at temperatures between 325° and 450° C., and activating the catalyst by heating in an atmosphere of hydrogen at temperatures between 25° and 450° C., the proportions of catalyst carrier material and of metal salts being so selected that there is, in the active catalyst, an effective proportion, not greater than 5 percent by weight of the catalyst, of a catalytically active metal composition consisting of from 60 to 99 parts by weight of palladium and from 40 to 1 part by weight of a metal selected from the group consisting of copper, silver and gold.

10. A method of making a catalyst, effective in promoting the selective hydrogenation of acetylene when contacted with a gas mixture of acetylene, ethylene and hydrogen, which method comprises impregnating a catalytically inactive solid carrier material with an aqueous solution comprising palladium nitrate and silver nitrate, drying the resulting mixture of carrier material and aqueous solution while stirring the mixture, roasting the dried composition while exposed to air at temperatures between 325° and 450° C., and activating the catalyst by heating in an atmosphere of hydrogen at temperatures between 25° and 450° C., the proportions of catalyst carrier material, palladium nitrate and silver nitrate being so selected that there is, in the active catalyst, from 0.1 to 5 percent by weight, based on the catalyst, of composite metal consisting of from 70 to 99 parts by weight of palladium and from 30 to 1 part of silver.

References Cited in the file of this patent

UNITED STATES PATENTS

| | | |
|---|---|---|
| 1,739,306 | Holmes | Dec. 10, 1929 |
| 1,836,927 | Linckh et al. | Dec. 15, 1931 |
| 1,935,188 | Latshaw | Nov. 14, 1933 |
| 2,167,708 | Carter et al. | Aug. 1, 1939 |
| 2,178,454 | Metzer et al. | Oct. 31, 1939 |
| 2,359,759 | Hebbard et al. | Oct. 10, 1944 |
| 2,423,686 | Cummins | July 8, 1947 |
| 2,437,706 | Paterson | Mar. 16, 1948 |